United States Patent
Danielsen

(10) Patent No.: US 9,641,024 B2
(45) Date of Patent: May 2, 2017

(54) REDUNDANT POWER SUPPLY ARCHITECTURE

(75) Inventor: Niels Erik Danielsen, Brabrand (DK)

(73) Assignee: VESTAS WIND SYSTEMS A/S, Aarhus (DK)

( * ) Notice: Subject to any disclaimer, the term of this patent is extended or adjusted under 35 U.S.C. 154(b) by 848 days.

(21) Appl. No.: 14/007,792

(22) PCT Filed: Mar. 29, 2012

(86) PCT No.: PCT/DK2012/050098
§ 371 (c)(1),
(2), (4) Date: Jan. 10, 2014

(87) PCT Pub. No.: WO2012/130247
PCT Pub. Date: Oct. 4, 2012

(65) Prior Publication Data
US 2014/0152011 A1    Jun. 5, 2014

(30) Foreign Application Priority Data
Mar. 30, 2011    (DK) .................................. 2011 70146

(51) Int. Cl.
*H02J 9/06*    (2006.01)
*F03D 7/00*    (2006.01)

(52) U.S. Cl.
CPC .................. *H02J 9/06* (2013.01); *F03D 7/00* (2013.01); *F05B 2260/845* (2013.01); *F05B 2270/107* (2013.01); *Y02E 10/723* (2013.01); *Y10T 307/344* (2015.04)

(58) Field of Classification Search
CPC ....................................................... H02J 3/005
USPC ........................................................ 307/43, 80
See application file for complete search history.

(56) References Cited

U.S. PATENT DOCUMENTS

| 5,831,346 | A | 11/1998 | Baumann et al. |
| 5,861,684 | A | 1/1999 | Slade et al. |
| 2011/0037264 | A1 | 2/2011 | Roddier et al. |
| 2011/0140534 | A1* | 6/2011 | Yasugi .................... H02J 3/005 307/80 |
| 2011/0276190 | A1* | 11/2011 | Lillis ...................... H02J 3/005 700/293 |

FOREIGN PATENT DOCUMENTS

EP    2236821 A1    10/2010

OTHER PUBLICATIONS

International Search Report and Written Opinion, PCT/DK2012/050098, Aug. 2, 2012.

* cited by examiner

Primary Examiner — Robert Deberadinis
(74) Attorney, Agent, or Firm — Patterson + Sheridan, LLP

(57) ABSTRACT

The present invention relates to a redundant power supply system for wind turbine control systems, said power supply system being adapted to supply power to one or more power consumers of a wind turbine control system, the redundant power supply system comprising a first power rail, a second power rail, and switching means being adapted to select the first or the second power rail so as to provide power to at least part of a power consumer from either the first power rail or the second power rail. The invention further relates to an associated method.

20 Claims, 5 Drawing Sheets

REDUNDANT POWER SUPPLY ARCHITECTURE

FIELD OF THE INVENTION

The present invention relates to a redundant power supply architecture for wind turbine related applications. In particular, the present invention relates to an architecture comprising two separate uninterruptible power supply (UPS) power rails.

BACKGROUND OF THE INVENTION

Known power supply systems for wind turbine related applications rely on a single power distribution path. Having only a single power distribution path makes such power supply systems very vulnerable to fault situations. In fact a single fault along the single power distribution path is capable of bringing the system down.

Thus, there is a need for more reliable power supply systems which are able to withstand at least some types of power faults.

It is an object of embodiments of the present invention to provide a redundant and highly reliable power supply system.

DESCRIPTION OF THE INVENTION

The above-mentioned object is complied with by providing, in a first aspect, a redundant power supply system for wind turbine control systems, said power supply system being adapted to supply power to one or more power consumers of a wind turbine control system, the redundant power supply system comprising
  a first power rail,
  a second power rail, and
  switching means being adapted to select the first or the second power rail so as to provide power to at least part of a power consumer from either the first power rail or the second power rail.

Thus, according to the present invention two separate and independently operable power rails provide power to the control system of the wind turbine. If one of the power rails fails the power consumers of the control system may shift, via the switching means, to the other power rail and thereby remain in an operating mode of operation. The switching means may be operated electrically. A power rail should be understood as a power supply line.

It is an advantage of the power supply system according to the present invention that
  1. It comprises redundant power rails
  2. The power rails may be powered from separate power sources
  3. The power sources may be combined with UPSs.

As stated above the first and second power rails may be independently operable. Each of the one or more power consumers may comprise integrated switching means being adapted to select between the first and the second power rails.

Over-current protection means may be provided between the first power rail and a number of the one or more power consumers. Similarly, over-current protection means may be provided between the second power rail and a number of the one or more power consumers.

One or more of the power consumers may comprise one or more distributed control nodes. Each distributed control node may comprise a distributed control system unit which either alone or in combination with other distributed control system units of other distributed control nodes form the complete control system of the wind turbine.

The power supply system according to the first aspect may comprise additional power rails in order to increase the reliability of the overall power system.

In a second aspect, the present invention relates to a wind turbine comprising a redundant power supply system according to the first aspect.

In a third aspect, the present invention relates to a method for providing power to one or more power consumers of a wind turbine control system in a redundant manner, the method comprising the steps of:
  providing a first power rail,
  providing a second power rail, and
  selecting the first or the second power rail so as to provide power to at least part of one or more power consumers of the control system from either the first power rail or the second power rail.

Again, a power rail should be understood as a power supply line. The step of selecting a power rail may be performed in accordance with availability of power from the first and second power rails. Thus, if one of the power rails is in some how defective the other power rail is selected. As an example the first power rail may be selected if the available amount of power from the second power rail is insufficient. Similarly, the second power rail may be selected if the available amount of power from the first power rail is insufficient.

BRIEF DESCRIPTION OF THE DRAWINGS

The present invention will now be explained in further details with reference to the accompanying figures, where.

Figure 1:
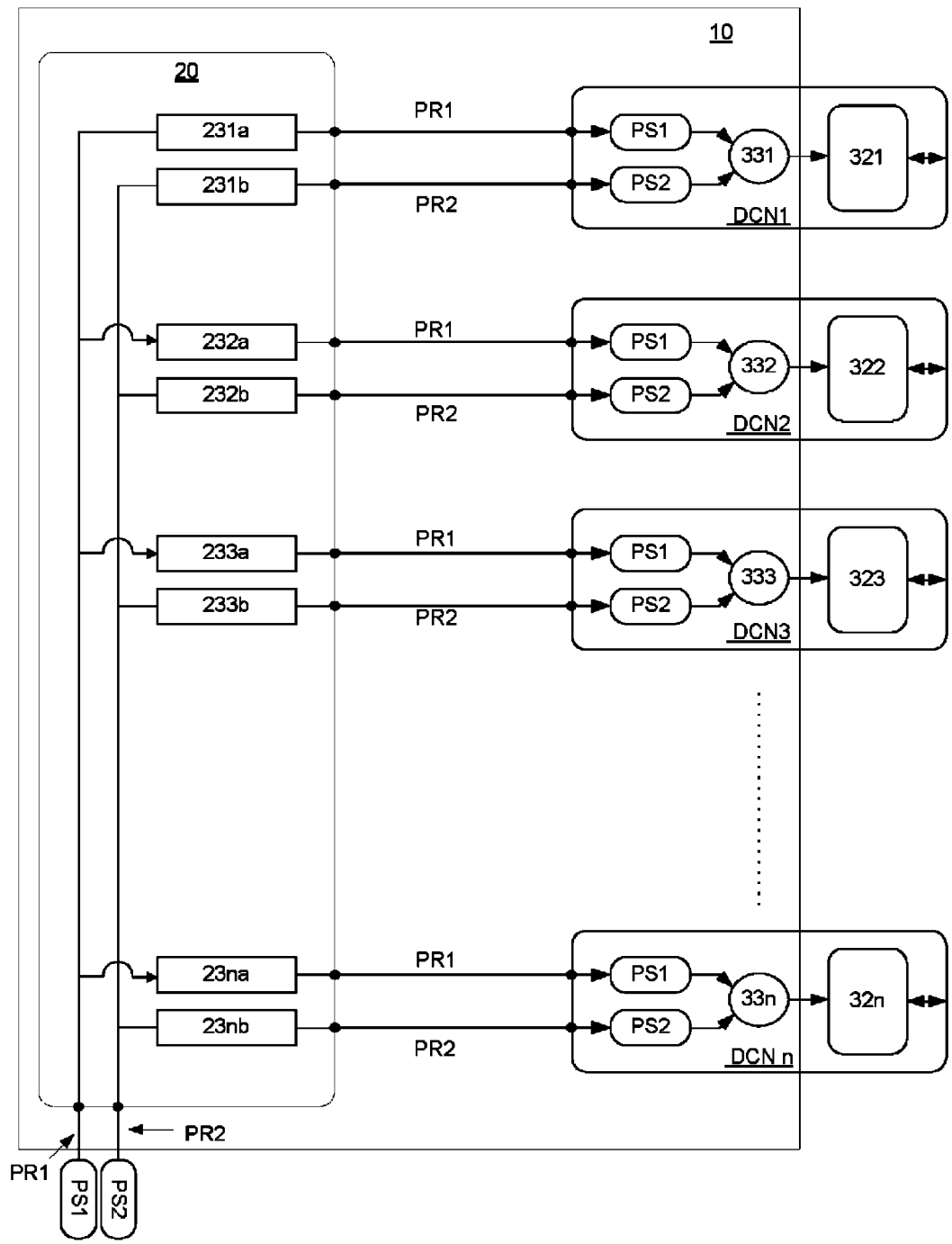
FIG. 1 shows a first embodiment of a power supply system.

While the invention is susceptible to various modifications and alternative forms, specific embodiments have been shown by way of examples in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE INVENTION

In its most general aspect the present invention relates to redundant power supply architectures for wind turbine control systems. It should be noted that the general layout of the power supply architecture presented here is applicable to other power supply systems as well.

FIG. 1 shows an embodiment of a power supply system 10 according to the present invention. The power supply system 10 includes a power distribution block 20 which feeds power to n distributed control nodes DCN1, DCN2, DCN3 . . . DCNn. The distributed control nodes DCN1, DCN2, DCN3 . . . DCNn are typically distributed throughout the wind turbine, e.g. in the tower, the nacelle and the hub of the wind turbine. As previously mentioned, each distributed control node DCN1, DCN2, DCN3, . . . , DCNn, respectively, may comprise a distributed control system unit 321, 322, 323, . . . , 32n, respectively, in the form of control logic circuitry which either alone or in combination with other distributed control system units of other distributed control nodes form the complete control system of the wind turbine.

The power distribution block 20 receives power from two independent power sources denoted PS1 and PS2, respectively, via two power rails PR1 and PR2, respectively. The number of independent power rails may in principle be arbitrary. However, to achieve redundancy at least two power rails are required. Thus, the present invention is not limited to power systems having precisely two independent power rails.

The two power sources PS1, PS2 to which the power rails PR1, PR2 are connected, provide either AC or DC power at appropriate voltage levels. Moreover, the two power rails PR1, PR2 can provide power from external power sources and/or UPSs assigned to the wind turbine. Thus, during normal working conditions the power rails PR1, PR2 may provide power from external power sources PS1, PS2, whereas during abnormal working conditions the power rails PR1, PR2 may provide power from for example two independent UPSs assigned to the wind turbine. An abnormal working condition may be a situation where an associated power grid is absent or any other situation where the voltage of an associated power grid is outside normal values.

The two power rails PR1, PR2, respectively, connect the components of the power supply system 10 to two power supplies PS1, PS2, respectively. Thus, each of the power rails PR1, PR2, respectively, connects a power source PS1, PS2, respectively to each of the components of the power system 10; for example first and second power rails PR1, PR2 connect the first power source PS1 to the power distribution block 20. The power distribution block 20 is connected via the first and second power rails PR1, PR2 to distributed control nodes DCN1, DCN2, DCN3, DCN4, . . . , DCNn. An over current protection circuitry is connected to each of the outputs of the power distribution block 20 in order not to overload the power supply system. Thus, the power supply system comprises an intelligent load shedding. In FIG. 1 this is shown as current protection circuitry 231a and 231b connected to the output of the power distribution block 20 feeding the distributed control node DCN1, current protection circuitry 232a and 232b connected to the output of the power distribution block 20 feeding the distributed control node DCN2, current protection circuitry 233a and 233b connected to the output of the power distribution block 20 feeding the distributed control node DCN3, and current protection circuitry 23na and 23nb connected to the output of the power distribution block 20 feeding the distributed control node DCNn.

As depicted in FIG. 1 each distributed control node DCN1, DCN2, DCN3, . . . , DCNn, respectively, comprises an arrangement, such as a switch 331, 332, 333, . . . , 33n, respectively for selecting between the two power rails, PR1 and PR2 and thus between the two power sources PS1 and PS2. Thus, each distributed control node DCN1, DCN2, DCN3 . . . DCNn is capable of selecting the power rail of the two power rails PR1, PR2, from which power should be provided. For example, if the first power rail PR1 fails, all distributed control nodes DCN1, DCN2, DCN3 . . . DCNn can be fed from the second power rail PR2. Also, if the available amount of power from the first power rail PR1 is limited, some distributed control nodes may be connected to the first power rail PR1, whereas the remaining distributed control nodes may be connected to the second power rail PR2.

In another embodiment of the present invention, the arrangements for selecting between the two power rails or power sources PR1, PR2 may be provided separately—i.e. separate from the distributed control nodes.

Figure 2:
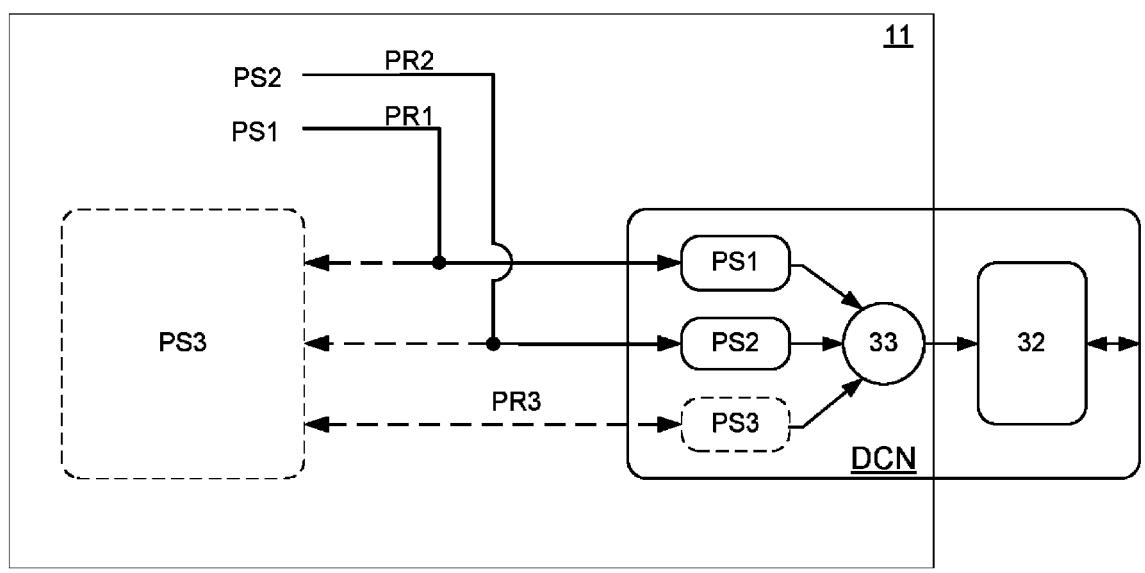
FIG. 2 shows a second embodiment of a power supply system.

As stated above, the present invention is not limited to power systems having precisely two independent power rails. Referring now to FIG. 2 a triple redundant power supply system 11 according to the invention is depicted. FIG. 2 shows a single distributed control node DCN, which may be supplemented by other distributed control nodes (not shown). The distributed control node DCN includes a distributed control system unit 32, in the form of control logic circuitry which either alone or in combination with other distributed control system units of other distributed control nodes forms the complete control system of the wind turbine.

As shown in FIG. 2 the two power rails PR1, PR2 of FIG. 1 are supplemented by an additional power source PR3 (dashed lines) in order to increase reliability and/or safety. The power rails PR1, PR2, PR3, respectively, are connected to power sources PS1, PS2, PS3, respectively. Thus, the system 11 of FIG. 2 includes an additional power source PS3 compared to the system 10 of FIG. 1. The additional power source PS3 may be an optional local UPS unit positioned e.g. in the tower, the nacelle or in the hub of the wind turbine. As depicted in FIG. 2 a switching arrangement 33 within the distributed control system unit is capable of selecting between the three power sources PS1, PS2, PS3.

Figure 3:
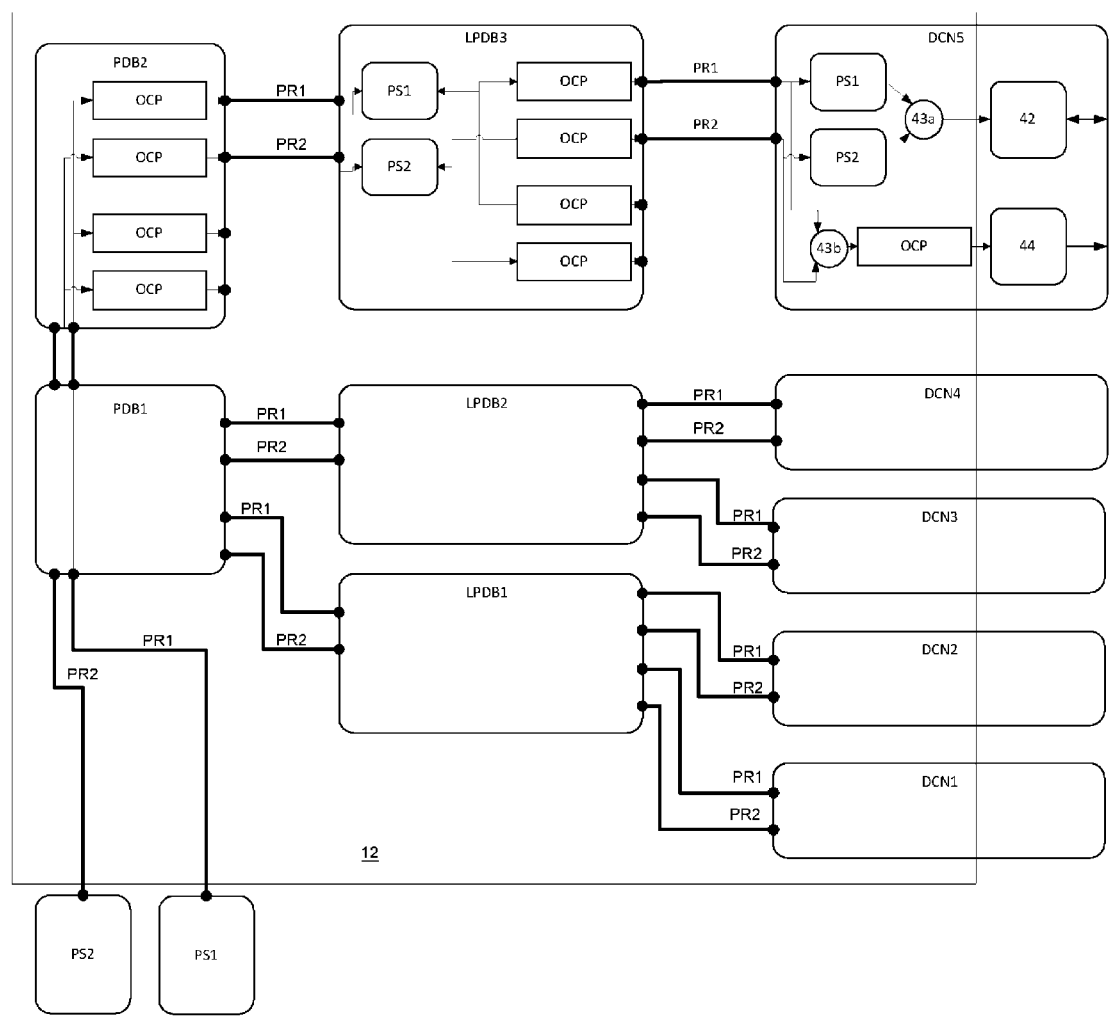
FIG. 3 shows a third embodiment of a power supply system.

FIG. 3 shows a third embodiment of a power supply system according to the invention. In FIG. 3, the power supply system 12 comprises two power distribution blocks PDB1, PDB2, three local power distribution blocks LPDB1, LPDB2, LPDB3 and five distributed control nodes DCN1, DCN2, DCN3, DCN4, DCN5. The power supply system 12 moreover comprises two power rails PR1, PR2, respectively, connecting the components of the power supply system 12 to two power supplies PS1, PS2, respectively. Thus, each of the power rails PR1, PR2, connects a power source to each of the components of the power system 12; for example first and second power rails PR1, PR2 connect the first power source PS1 to the first and second local power distribution block LPDB1, LPDB2 through the first power distribution block 1. The first local power distribution block LPDB1 is connected via first and second power rail PR1, PR2 to the first and second distributed control node DCN1, DCN2, whilst the second local power distribution block LPDB2 is connected via first and second power rail PR1, PR2 to the third distributed control node DCN3.

The second power distribution block PDB2 is connected to a third local power distribution block LPDB3 which is connected to a fifth distributed control node DCN5 by means of the first and second power rails PR1, PR2. The two power distribution blocks PDB1, PDB2 as well as the local power distribution blocks LPDB1, LPDB2, LPDB3 may each contain over current protection units OCP on each of the rails PR1, PR2.

The part of the power rails PR1, PR2 connecting the third local power distribution block LPDB3 and the fifth distribution control node DCN5 may be low voltage or extra-low voltage, e.g. 24 V. The first power source PS1 and the second power source PS2 may be of different power characteristics. As an example only, the first power source PS1 could be a power source of 560 VDC supplied by a UPS, whilst the second power source PS2 could be a power source of 400 V AC supplied by the electrical grid and optionally also connected to a UPS.

Each of the distributed control nodes DCN1-DCN5 may further comprise a distributed control system unit 42 (not shown in relation the first, second, third and fourth distributed control node DCN1-DCN4) in the form of control logic circuitry which either alone or in combination with other distributed control system units of other distributed control nodes form the control system of the wind turbine. Furthermore, each of the distributed control nodes DCN1-DCN5 may further comprise outputs 44 (not shown in relation to the first, second, third and fourth distributed control node DCN1-DCN4)

Figure 4:
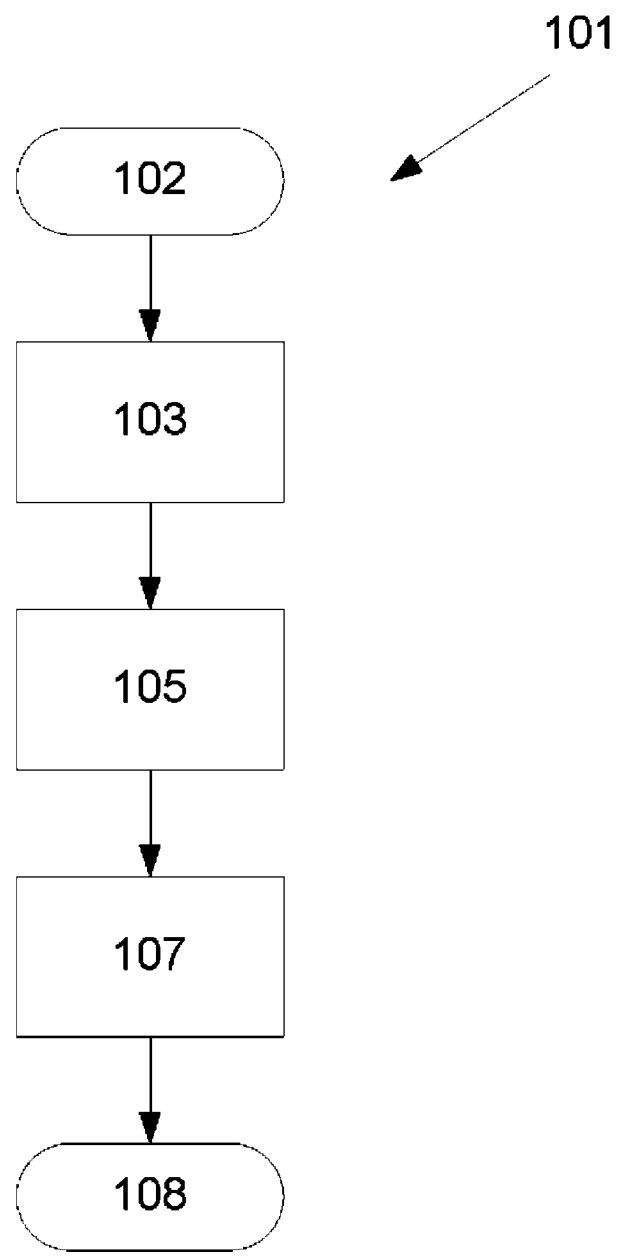
FIG. 4 shows a method according to an embodiment of the invention.

Each of the distributed control nodes DCN1-DCN5 may further include one or two arrangements 43a, 43b, such as switches, for selecting between the two power rails, PR1 and PR2 and thus between the two power sources PS1 and PS2. Thus, each distributed control node DCN1, DCN2, DCN3 . . . DCNn is capable of selecting the power rail of the two power rails PR1, PR2, from which power should be provided. For example, if the first power rail PR1 fails, all distributed control nodes DCN1-DCN5 can be fed from the second power rail PR2. Also, if the available amount of power from the first power rail PR1 is limited, some distributed control nodes may be connected to the first power rail PR1, whereas the remaining distributed control nodes may be connected to the second power rail PR2. FIG. 4 shows a method 101 according to an embodiment of the invention for providing power to one or more power consumers of a wind turbine control system in a redundant manner. The method starts in step 102, and proceeds to step 103 wherein a first power rail is provided. In a subsequent step, step 105, a second power rail is provided. A subsequent step, step 107, comprises selecting the first or the second power rail so as to provide power to at least part of one or more power consumers of the control system from either the first power rail or the second power rail. The method ends in step 108.

Figure 5:
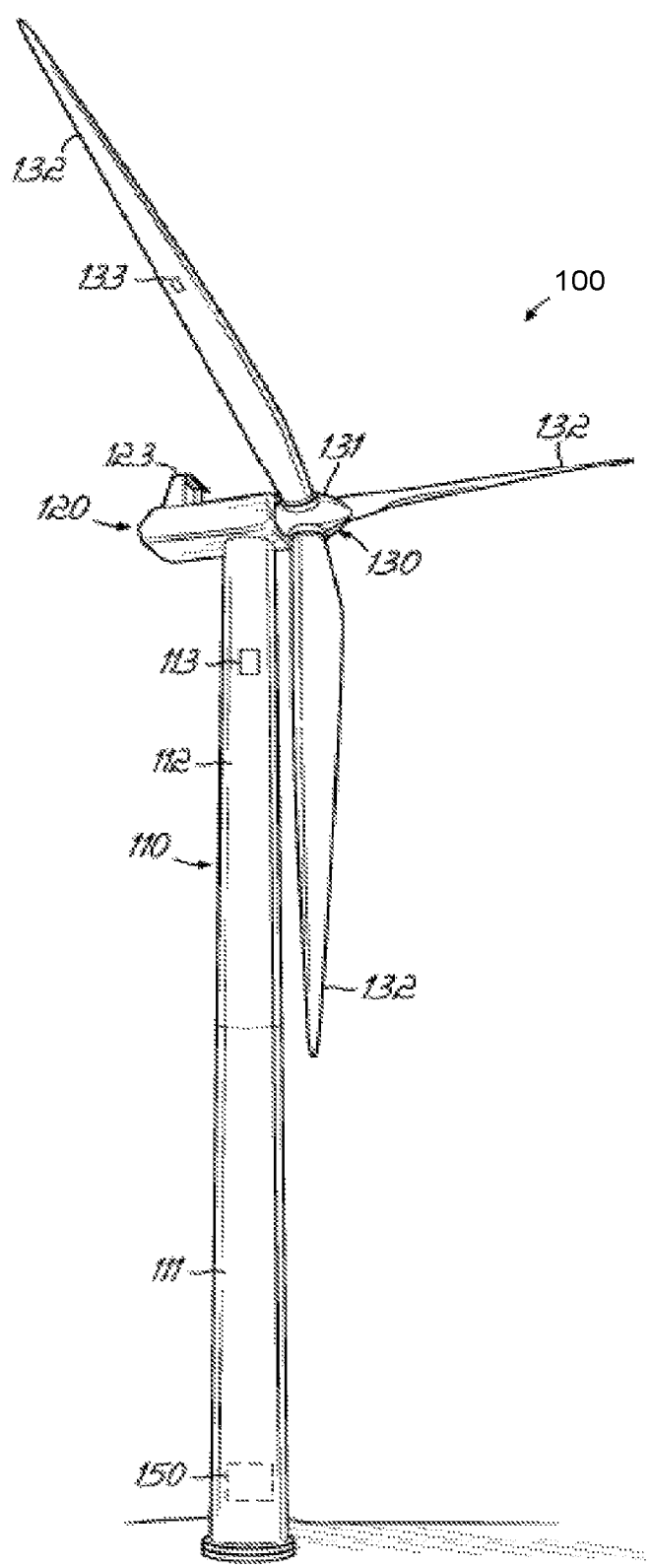
FIG. 5 illustrates an exemplary wind turbine 100 according to an embodiment of the invention.

FIG. 5 illustrates an exemplary wind turbine 100 according to an embodiment of the invention. As illustrated in FIG. 5, the wind turbine 100 includes a tower 110, a nacelle 120, and a rotor 130. In one embodiment of the invention, the wind turbine 100 may be an onshore wind turbine. However, embodiments of the invention are not limited only to onshore wind turbines. In alternative embodiments, the wind turbine 100 may be an off shore wind turbine located over a water body such as, for example, a lake, an ocean, or the like.

The tower 110 of wind turbine 100 may be configured to raise the nacelle 120 and the rotor 130 to a height where strong, less turbulent, and generally unobstructed flow of air may be received by the rotor 130. The height of the tower 110 may be any reasonable height. The tower 110 may be made from any type of material, for example, steel, concrete, or the like. In some embodiments the tower 110 may be made from a monolithic material. However, in alternative embodiments, the tower 110 may include a plurality of sections, for example, two or more tubular steel sections 111 and 112, as illustrated in FIG. 5. In some embodiments of the invention, the tower 110 may be a lattice tower. Accordingly, the tower 110 may include welded steel profiles.

The rotor 130 may include a rotor hub (hereinafter referred to simply as the "hub") 131 and at least one blade 132 (three such blades 132 are shown in FIG. 5). The rotor hub 131 may be configured to couple the at least one blade 132 to a shaft (not shown). In one embodiment, the blades 132 may have an aerodynamic profile such that, at predefined wind speeds, the blades 132 experience lift, thereby causing the blades to radially rotate around the hub. The nacelle 120 may include one or more components configured to convert aero-mechanical energy of the blades to rotational energy of the shaft, and the rotational energy of the shaft into electrical energy.

The wind turbine 100 may include a plurality of sensors for monitoring a plurality of parameters associated with, for example, environmental conditions, wind turbine loads, performance metrics, and the like. For example, a strain gauge 133 is shown on the blade 132. In one embodiment, the strain gauge 133 may be configured to detect bending and or twisting of the blades 132. The information regarding bending and twisting of the blades may be necessary to perform one or more operations that reduce the loads on the blades 132 that may occur, for example, during high wind gusts. In such situations, the blades may be pitched to reduce the loads, thereby preventing damage to the blades.

FIG. 5 also illustrates an accelerometer 113 that may be placed on the tower 110. The accelerometer 113 may be configured to detect horizontal movements and bending of the tower 110 that may be caused due to the loads on the wind turbine 100. The data captured by the accelerometer 113 may be used to perform one or more operations for reducing loads on the wind turbine 100. In some embodiments of the invention, the accelerometer 113 may be placed on the nacelle 120.

FIG. 5 also depicts a wind sensor 123. Wind sensor 123 may be configured to detect a direction of the wind at or near the wind turbine 100. By detecting the direction of the wind, the wind sensor 123 may provide useful data that may determine operations to yaw the wind turbine 100 into the wind. The wind sensor 123 may also detect a speed of the wind. Wind speed data may be used to determine an appropriate pitch angle that allows the blades 132 to capture a desired amount of energy from the wind. In some embodiments, the wind sensor 123 may be integrated with a temperature sensor, pressure sensor, and the like, which may provide additional data regarding the environment surrounding the wind turbine. Such data may be used to determine one or more operational parameters of the wind turbine to facilitate capturing of a desired amount of energy by the wind turbine 100.

The invention claimed is:

1. A redundant power supply system for wind turbine control systems, said power supply system being adapted to supply power to a plurality of distributed control nodes within a wind turbine via at least one of a first power rail and a second power rail,
    wherein the plurality of distributed control nodes comprise:
        respective switching means coupled to the first power rail and the second power rail, and
        respective control units configured to select at least one of the first power rail and the second power rail to provide power via the respective switching means to the respective distributed control node, wherein each control unit operates independently from the other control units within the plurality of distributed control nodes such that each distributed control node is capable of independently selecting between the first power rail and the second power rail.

2. The redundant power supply system according to claim 1, wherein the first and second power rails are independently operable.

3. The redundant power supply system according claim 1, further comprising over-current protection means between the first power rail and each of the plurality of distributed control nodes.

4. The redundant power supply system according to claim 1, further comprising over-current protection means between the second power rail and each of the plurality of distributed control nodes.

5. The redundant power supply system according to claim 1, wherein the first power rail is connected to a first power supply and the second power rail is connected to a second power supply, wherein the power characteristics of the first power supply are different from the second power supply.

6. The redundant power supply system according to claim 5, further comprising one or more local power distribution blocks connected between the first power supply and the second power supply providing power to the first power rail and the second power rail, respectively, and the plurality of distributed control nodes.

7. The redundant power supply system according to claim 6, wherein the connection between the one or more local power distribution blocks and the plurality of distributed control nodes is a low voltage or extra-low voltage power rail.

8. The redundant power supply system according to claim 1, further comprising a third power rail, wherein:
the respective switching means of the plurality of distributed control nodes is coupled to the first power rail, the second power rail, and the third power rail; and
the respective control units are configured to select at least one of the first power rail, the second power rail, and the third power rail.

9. The redundant power supply system according to claim 8, wherein the third power rail is coupled with a third power supply, wherein the third power supply is an uninterruptable power supply located within the wind turbine.

10. A system, comprising:
a wind turbine; and
a redundant power supply system operably connected to the wind turbine, the redundant power supply system being adapted to supply power to a plurality of distributed control nodes within a wind turbine via at least one of a first power rail and a second power rail,
wherein the plurality of distributed control nodes comprise:
respective switching means coupled to the first power rail and the second power rail, and
respective control units configured to select at least one of the first power rail and the second power rail to provide power via the respective switching means to the respective distributed control node, wherein each control unit operates independently from the other control units within the plurality of distributed control nodes such that each distributed control node is capable of independently selecting between the first power rail and the second power rail.

11. The system according to claim 10, further comprising a third power rail, wherein:
the respective switching means of the plurality of distributed control nodes is coupled to the first power rail, the second power rail, and the third power rail; and
the respective control units are configured to select at least one of the first power rail, the second power rail, and the third power rail.

12. The redundant power supply system according to claim 11, wherein the third power rail is coupled with a third power supply, wherein the third power supply is an uninterruptable power supply located within the wind turbine.

13. The system according to claim 10, wherein the first power rail is connected to a first power supply and the second power rail is connected to a second power supply, wherein the power characteristics of the first power supply are different from the second power supply.

14. A method for providing power to a plurality of distributed control nodes within a wind turbine in a redundant manner, wherein the plurality of distributed control nodes comprise:
respective switching means coupled to a first power rail and a second power rail, and
respective control units;
the method comprising:
selecting, using the respective control units, at least one of the first power rail and the second power rail to provide power via the respective switching means to the respective distributed control node, wherein each control unit operates independently from the other control units within the plurality of distributed control nodes such that each distributed control node is capable of independently selecting between the first power rail and the second power rail.

15. The method according to claim 14, wherein the step of selecting a power rail is performed in accordance with availability of power from the first and second power rails.

16. The method according to claim 15, wherein the first power rail is selected if the available amount of power from the second power rail is insufficient.

17. The method according to claim 15, wherein the second power rail is selected if the available amount of power from the first power rail is insufficient.

18. The method according to claim 14, wherein:
the respective switching means of the plurality of distributed control nodes is coupled to the first power rail, the second power rail, and a third power rail; and
the respective control units are configured to select at least one of the first power rail, the second power rail, and the third power rail.

19. The method according to claim 18, wherein the third power rail is coupled with a third power supply, wherein the third power supply is an uninterruptable power supply located within the wind turbine.

20. The method according to claim 14, wherein the first power rail is connected to a first power supply and the second power rail is connected to a second power supply, wherein the power characteristics of the first power supply are different from the second power supply.

* * * * *